United States Patent Office 2,947,331
Patented Aug. 2, 1960

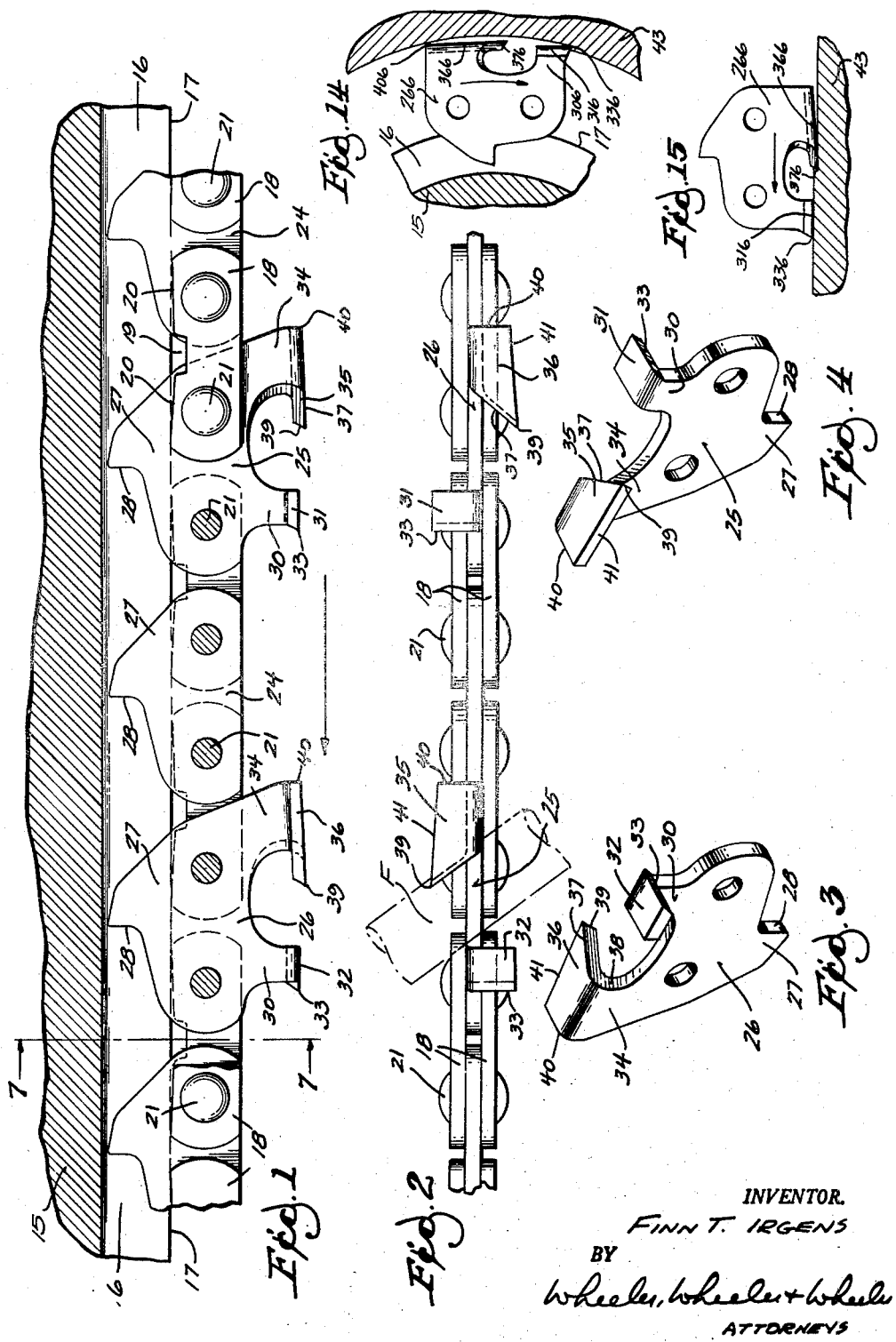

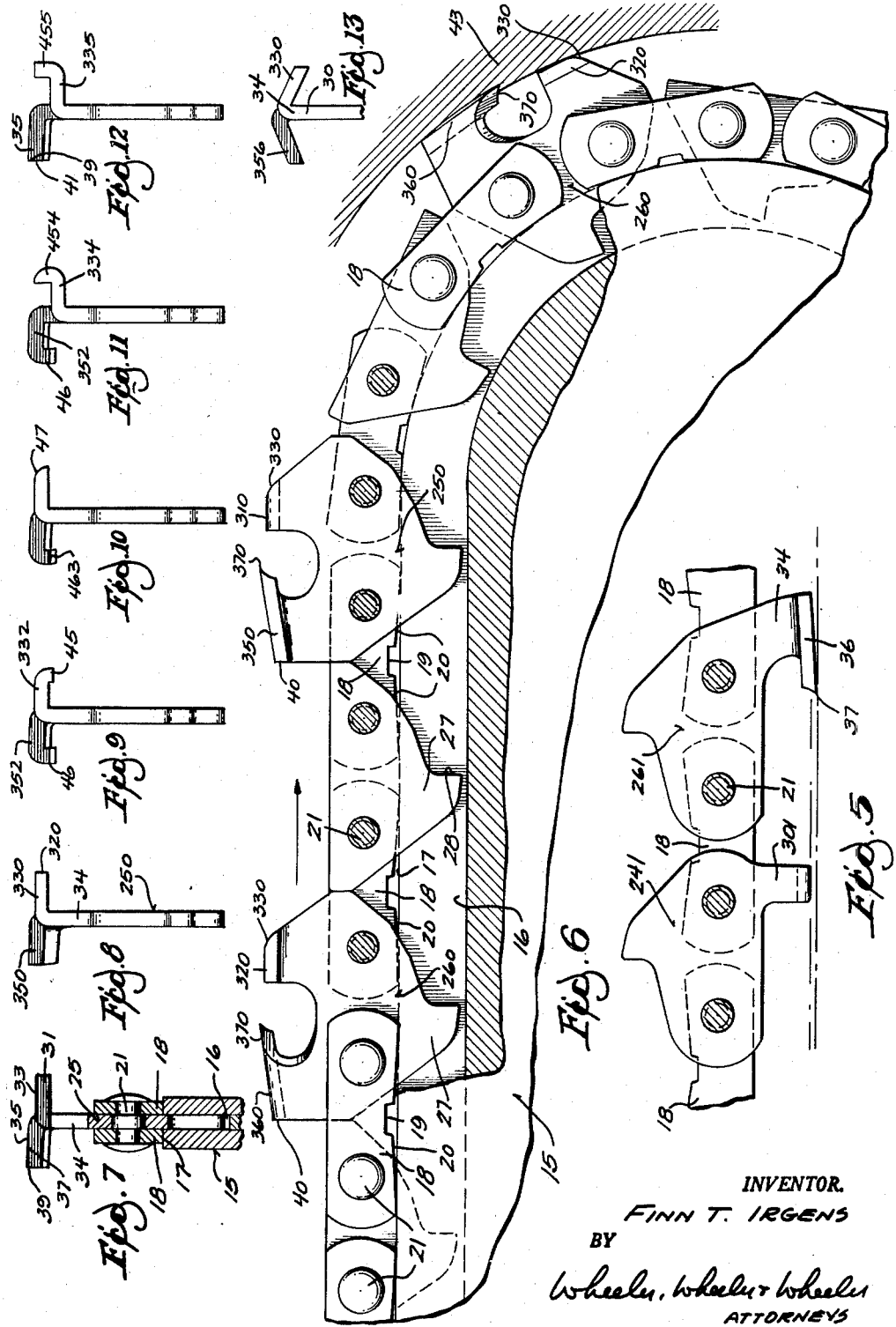

2,947,331

SAW CHAIN AND TOOTH-CARRYING LINK

Finn T. Irgens, Wauwatosa, Wis., assignor to Outboard Marine Corporation, Waukegan, Ill., a corporation of Delaware Filed Nov. 5, 1956, Ser. No. 620,385

2 Claims. (Cl. 143—135)

This invention relates to a saw chain and tooth-carrying link.

Saw chains comprise tooth-carrying links driven by power about a bar or blade with which the links are interlocked against a lateral displacement, the blade usually being channeled along its perimeter and some or all center chain links having guide wings riding in the channel. In most saw chains, there are allochiral router links respectively carrying right and left router teeth and depth gauge fingers which usually ride on the surface of the resulting kerf and project slightly less than the ensuing router tooth to limit the depth of cut.

The present chain employs three distinct types of center link, all of the outer links being identical with each other. A typical sequence of center links comprises one center link having a right hand router tooth, the ensuing center link having no cutting teeth, the third center link having a left hand router tooth, and the fourth center link being like the second. All of these center links desirably are provided with guide wings engaged in the channel of the blade. The respective router links desirably have their shank portions in the plane of the center link, the respectively right and left hand teeth comprising terminal portions of the shanks which are bent outwardly at a desired angle to the shank and have sharpened leading margins usually oblique respecting the path of travel.

Whereas most saw chains use depth gauge fingers which are merely the thickness of the link, I prefer to use a depth gauge finger which is flanged like the router tooth, but in the opposite direction so that the right hand router tooth will be preceded by a left projecting depth gauge flange, and vice-versa. Moreover, whereas the ordinary saw chain has its depth gauge finger provided with a rounded surface to ride on the freshly cut bottom of the kerf, I prefer to provide my depth gauge finger flange with a sharpened leading edge to constitute it as a cutting tooth. Despite the fact that the depth gauge flange is at a level slightly closer to the chain than the ensuing router tooth, it is important that it be constituted as a cutting tooth for two reasons:

In the first place, the surface of the wood into which the kerf is cut by the saw chain is seldom smooth. It may contain not only loose ends of fibers but also splinters left unsevered by the preceding routing tooth. Prior art saw chains have been constructed to enable the depth gauge finger to ride over all such obstructions. However, this results in erratic cutting by the router teeth, which have been deflected in their depth of cut by every such obstruction over which the preceding depth gauge finger rises. The depth gauge finger constituted as a sharpened tooth, cuts away such obstructions, thus enabling the ensuing router tooth to make its deeper cut at a relatively constant level, with a relatively smoother and more effective operation. There is little or no tendency of the depth gauge tooth to dig into the wood because, unlike the router teeth, which are pitched for clearance, the top of the depth gauge tooth is desirably parallel or substantially parallel to the path of travel of the chain around the edge of the bar or blade.

The second advantage of sharpening the depth gauge tooth flange for cutting purposes has to do with the operation known as "boring." Even with existing saw chains it is common practice, particularly in the cutting of tree trunks of greater than the length of the blade, to initiate the cut by forcing the blade endwise into the log, thereafter moving it laterally to expand the cut. The ordinary chain is extremely inefficient in this boring operation, for the reason that as the chain passes around the curved end of the blade, the heel of the routing tooth and the end of the depth gauge finger are the only parts which contact the work. The sharpened leading edge of the routing tooth lies on a chord of the arc traversed by the chain and is completely out of contact with the work. Accordingly, the boring operation is performing more by abrasion than by any actual cutting and considerable overheating and excessive wear on the chain and blade result. Because of my provision of a sharpened cutting tooth on the depth gauge finger, this tooth is so located as to be extremely effective for routing purposes as it passes arcuately about the end of the bar.

In one embodiment of the invention as herein disclosed, I have shown the primary routing teeth provided with excessive rake or clearance to withdraw their heel portions inwardly far enough to leave the cutting edge active in traversing the curved end of the blade. When this is done, it is not necessary that the depth gauge flange be sharpened to function as a cutting tooth, it being understood, however, that I may also use a cutting edge on the depth gauge finger if desired. The excessively raked routing tooth structure is not preferred because of the excessive change of dimension which results from successive sharpening operations.

In the drawings:

Fig. 1 is a fragmentary view in side elevation showing on an enlarged scale a portion of a saw chain embodying the invention, its blade or bar being fragmentarily illustrated in section.

Fig. 2 is an inverted plan view of the chain of Fig. 1, the approximate position of a sharpening file being shown in broken lines.

Fig. 3 is a view in perspective of a center link carrying a left hand router tooth and a right hand depth gauge tooth.

Fig. 4 is a view in perspective of a center link carrying a right hand router tooth and left hand depth gauge tooth.

Fig. 5 is a fragmentary view in side elevation of a modified type of chain in which the depth gauge tooth is carried on the intermediate center link instead of on either of the links which carry one of the router teeth.

Fig. 6 is a fragmentary view of a modified chain embodiment designed particularly for boring, the associated bar or blade portions being broken away to the plane of the channel.

Fig. 7 is a fragmentary detailed view taken in cross section on the line 7—7 of Fig. 1.

Fig. 8 is a view similar to Fig. 7 showing a depth gauge finger which has no toothed edge.

Fig. 9 is a view similar to Fig. 7 showing a further modified link in front elevation.

Fig. 10 is a view similar to Fig. 9 showing a further modified link in front elevation.

Fig. 11 is a view similar to Fig. 9 showing a further modified link in front elevation.

Fig. 12 is a view similar to Fig. 9 showing a further modified link in front elevation.

Fig. 13 is a view somewhat similar to Figs. 8 to 12 showing a further modified link embodying the invention.

Fig. 14 is a diagrammatic view on a reduced scale showing a single cutter link as it appears in a "boring" operation, the work and bar being fragmentarily illustrated in section.

Fig. 15 is a diagrammatic view showing on the scale of Fig. 14 in side elevation a single link as it appears in use in straight sawing, the work being fragmentarily illustrated in section.

The blade or bar 15 may be assumed to be conventional having a channel at 16 for the guidance of the saw chain. Usually the blade or bar has a rounded end around which the channel extends continuously as best shown in Fig. 6. Bordering the channel, the blade or bar is provided with hard bearing surfaces 17 upon which ride the pairs of side links 18 of the chain. As above stated, all of the side links 18 may be identical. Each is provided with a notch at 19 to receive the tooth of the propelling sprocket, not shown. The surfaces 20 of the side links which ride on the bearing surface 17 of the bar desirably have a slight pitch away from the bar toward the notch 19 as clearly appears in Figs. 1 and 6.

Pivotally connected between the side links 18 by means of rivets 21 are the center links 24, 25 and 26. All of these center links desirably have wing portion 27 riding in the channel 16 of the blade. Each such wing portion is desirably provided with a forwardly directed abrupt shoulder at 28 which tends to sweep sawdust and chips from the channel. The links 24 which intervene between the consecutive allochiral links 25 and 26 will ordinarily carry no outward projections of any kind although they may carry depth gauge fingers as indicated in Fig. 5, where the link 241 has such a finger hereinafter to be described.

The center links 25 and 26 are preferably constructed as clearly shown in Fig. 3 and Fig. 4. The leading edge of each is provided with a depth gauge finger 30 which carries a flange extending laterally from the plane of the link as shown at 31 and 32, the flange 31 extending to the left and the flange 32 to the right as viewed in the direction of motion. Each flange desirably projects forwardly of the finger 30 and has a sharpened leading edge at 33 for purposes already described. The top surface of the cutting tooth flange thus made is desirably parallel to the path of movement of the chain. Although it may be given a slight positive or negative rake if desired, it is sufficiently parallel to the path of movement of the chain so that it can properly perform its indicated function by limiting the depth of cut of the router tooth which follows. The location of the depth gauge finger is desirably such that the effective portion is approximately centered with the rivet 21 at the end of the link.

At the rear of each of the links 25 and 26 is the shank 34 of a routing tooth. In the case of the link 25, the router tooth 35 comprises a flange bent to the right as viewed in the direction of chain movement. In the case of the link 26, the routing tooth 36 comprises a flange bent to the left as viewed in the direction of chain movement. The flanges are both cut to provide chisel teeth, the sharpening of their respective edges at 37 desirably extending to the adjacent leading edges of shank at 38.

This can conveniently be done by subjecting these edges to the action of a cylindrical file F held at the approximate angle of 35 to 45° shown in Fig. 2. However, the sharpening can be done with a flat faced file or any other file which will give an approximately correct bevel to the chisel edge 37. This chisel edge and the edge 39 at the apex of the routing tooth do practically all of the cutting other than the trimming and boring operations performed by the edge 33 of the depth gauge tooth. Consequently, in the saw chain of the present invention, the generally vertical edge of shank 34 is relatively unimportant. The chisel edge 37 is desirably approximately centered outwardly from the trailing rivet of the link 25 or 26 upon which the router tooth is carried. Thus the respective depth and routing teeth of each such link are spaced approximately the same as the respective rivets.

It will be observed that the exposed face of the routing tooth flanges 35 and 36 has a slight rake whereby the rear portion or heel 40 of each is closer to the chain than is the cutting edge 37 (Fig. 1). In each instance, also, the outer margin 41 of the flange constituting the tooth is convergent rearwardly to the center line of the chain as best appears in Fig. 2. In both instances, the cutting edge 37 of the router tooth 35 or 36 is more remote from the bar than is the depth gauge tooth 31 or 32, the difference representing the depth of cut of the router tooth. In sharpening the router teeth, the approximate differential should be preserved by filing off the top of the depth gauge tooth when necessary. No attempt is made to indicate what this differential is, since the practice varies according to the desires of manufacturers and users, and the offset is sometimes changed by the user according to the wood to be sawed.

Without limitation, I desire to disclose a number of variations from the preferred embodiment of the invention as above described. In the construction shown in Fig. 6 and Fig. 8, the depth gauge flanges 310 and 320 of links 250 and 260 differ from the flanges previously described in that their forward margins 330 are rounded slightly instead of being constituted as teeth. It will be understood that this type of depth gauge may be substituted for the depth gauge shown in Figs. 1 to 4 without other modifications.

Another change proposed in Figs. 6 and 8 lies in the fact that the routing teeth 350 and 360 of center links 250 and 260 have a very pronounced rake so that their cutting edges 370 will be exposed for operation on the work surface 43 as shown at the right of Fig. 6. Giving the tooth excessive rake means that as it is sharpened, its height will be reduced rather rapidly requiring corresponding reduction in the height of the depth gauge tooth. Offsetting this disadvantage is the fact that it represents a very efficient device for boring, making it unnecessary to provide a cutting edge on the depth gauge tooth. It is to be understood, however, that this feature also is individually usable in the device of Figs. 1 to 4 wherein the depth gauge tooth does have a cutting edge.

Another feature which may be substituted in the device of Figs. 1 to 4 is shown in Fig. 5 wherein the depth gauge teeth are eliminated from the center links 261 which carry the router teeth, the depth gauge fingers 301 being mounted on the intermediate center links 241. Here again the depth gauge tooth does not necessarily require a cutting edge because it is now carried sufficiently far in advance of the regular router so that as the chain rounds the curved outer end of the bar the router projects into a position for quite effective boring action.

Since the router tooth and the gauge finger flange project in opposite directions from the plane of the central links of the chain, it will be evident that each gauge tooth will bear against the surface previously cut by a router tooth of the opposite sense of the tooth which follows the depth gauge. The lateral projection being desirably about the same, it follows that I prefer that the lateral surfaces of the depth gauge should correspond in front elevational outline approximately with the lateral surfaces of the router teeth. This is true of the construction shown in Figs. 1 to 4 and 7. It is also true of the device of Figs. 6 and 8.

It is further true of the device of Fig. 9 which is a modification wherein the depth gauge flange 332 and the router flange 352 both have their margins extended downwardly as indicated at 45 and 46 respectively. If desired, only one of these flanges may extend downwardly as shown at 463 in Fig. 10, the other flange merely being rounded as indicated at 47.

In the construction of Fig. 11 the router blade 352 is substantially identical with that of Fig. 9, but the depth gauge flange 334 has its upwardly turned flange 454 as its only effective depth gauge portion, the rounding of the lateral margin corresponding to the curve at the outer margin of the router tooth.

In the construction shown in Fig. 12, the router tooth 35 may be the identical tooth of Figs. 1 to 4. Because this terminates in a square cut side margin at 41, the depth gauge arm 335 has its upwardly turned flange 455 square cut to match the path made by the next preceding router blade on its side of the chain.

In all of these various embodiments, the depth gauge serves not merely to limit the depth of cut of the next succeeding router blade, but it also guides the chain laterally from the side surface of the kerf, giving great stability and smoothness of operation.

While it so happens that in all of these various embodiments, teeth have been illustrated as projecting at right angles from the plane of the link outwardly toward the side of the kerf, it should be observed that this is not essential to successful operation, since the kerf may be of any appropriate cross section according to desired contours of the cutting surface. A very satisfactory, stable operation results, for example, if the respective flanges of the depth gauge router teeth have a downward pitch from their point of mounting on their respective shanks whereby thrust of the operator exerted through the chain upon the work tends constantly to center the chain in the kerf. An example of one allochiral tooth of this type is shown in Fig. 13, wherein the router tooth 356 and the depth gauge flange or tooth 336 are downwardly divergent from the central plane of the link in the manner above described.

Fig. 14 shows a link 266, similar in many respects to that shown in Fig. 3 and Fig. 4, having a router tooth 366 with a cutting edge 376 and being provided forwardly of the router tooth with a finger 306 having a flange portion 316 for limiting the depth of cut, the flange portion desirably projecting forwardly of the finger and having a cutting edge at 336. Fig. 14 shows this cutting edge effective in "boring" when the chain is rounding the curved end of bar 15, only the heel 406 of the router tooth being engaged with the work and the cutting being done solely by the sharpened leading edge 336 of the depth gauge finger.

Fig. 15 shows the operation in normal straight sawing where the cutting is being done entirely by the edge 376, the sharpened edge 336 of the depth gauge finger being ineffective except for trimming.

I claim:

1. A saw chain comprising a plurality of links and pivotal connections and provided at intervals with allochiral routing teeth comprising central mounting shanks and oppositely directed flanges provided with forwardly directed cutting edges, the said chain being provided in advance of respective routing teeth with means for limiting the cutting penetration of said teeth, said means constituting supplemental cutting teeth effective in boring and normally ineffective for cutting during rectilinear travel, such supplemental teeth having top faces approximately parallel to the path of chain travel and forwardly directed cutting edges and each of which supplemental cutting teeth extends oppositely to the routing tooth which it precedes, whereby to ride on a work surface formed by a preceding routing tooth allochiral respecting the first mentioned routing tooth.

2. In a saw chain adapted to cut a kerf in the work, the combination with a plurality of center links and interconnecting side links of allochiral router teeth mounted in alternation on center links and provide with mounting shanks substantially in the plane of respective center links and from which alternate routing teeth project in opposite directions, each such routing tooth comprising a flange with a forwardly directed cutting edge and having lateral and rearward clearance behind said edge, said chain further comprising depth gauge means preceding respective routing teeth and each constituting a flange directed oppositely to the router tooth it precedes and formed to ride on the surface cut by a router tooth immediately ahead of the depth gauge flange, each flange last mentioned having a forwardly directed cutting edge and having an outer surface extending from its cutting edge rearwardly substantially parallel to the path of chain movement whereby said last mentioned cutting edge is not adapted to make a fresh cut in the work, but is adapted to cut unsevered portions of the work which project into the kerf traversed by said depth gauge means, each such depth gauge flange being closer to the center line of the chain than the cutting edge of the flange of the router tooth which precedes it and approximately at the same spacing from the center line of the chain as the trailing edge of the flange of the router tooth which precedes it.

References Cited in the file of this patent

UNITED STATES PATENTS

| | | |
|---|---|---|
| 2,651,336 | Warren | Sept. 8, 1953 |
| 2,652,076 | Bye | Sept. 15, 1953 |

FOREIGN PATENTS

| | | |
|---|---|---|
| 822,900 | Germany | Nov. 29, 1951 |
| 870,181 | Germany | Mar. 12, 1953 |
| 913,955 | Germany | June 24, 1954 |